(12) United States Patent  (10) Patent No.: US 8,111,628 B2
Yin  (45) Date of Patent: Feb. 7, 2012

(54) METHOD FOR MEASURING DIFFERENT FREQUENCIES/SYSTEMS IN MBMS AND A DEVICE FOR SETTING MEASURING TIME

(75) Inventor: Liyan Yin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1070 days.

(21) Appl. No.: 11/912,042

(22) PCT Filed: Apr. 21, 2006

(86) PCT No.: PCT/CN2006/000766
§ 371 (c)(1),
(2), (4) Date: Jan. 4, 2008

(87) PCT Pub. No.: WO2006/111101
PCT Pub. Date: Oct. 26, 2006

(65) Prior Publication Data
US 2008/0170557 A1   Jul. 17, 2008

(30) Foreign Application Priority Data

Apr. 21, 2005 (CN) .......................... 2005 1 0064770

(51) Int. Cl.
*H04L 12/26* (2006.01)
*H04B 7/00* (2006.01)
*H04J 3/06* (2006.01)
(52) U.S. Cl. .................. 370/252; 370/310; 370/504
(58) Field of Classification Search .................. None
See application file for complete search history.

(56) References Cited

U.S. PATENT DOCUMENTS

| 6,978,138 | B2 * | 12/2005 | Japenga et al. | ............... 455/436 |
| 7,224,977 | B2 * | 5/2007 | Cavalli et al. | ............... 455/452.1 |
| 7,313,116 | B2 * | 12/2007 | Lee et al. | ....................... 370/335 |
| 7,437,178 | B2 * | 10/2008 | Jeong et al. | ..................... 455/525 |
| 7,509,097 | B2 * | 3/2009 | Irie et al. | ..................... 455/67.13 |
| 7,616,611 | B2 * | 11/2009 | Hwang et al. | .................. 370/336 |
| 2003/0218995 | A1 * | 11/2003 | Kim et al. | ...................... 370/318 |
| 2005/0213583 | A1 * | 9/2005 | Lee et al. | ................... 370/395.5 |

(Continued)

FOREIGN PATENT DOCUMENTS

CN   1496161   5/2004

(Continued)

OTHER PUBLICATIONS

International Search Report—Mailed Aug. 10, 2006.

(Continued)

*Primary Examiner* — Warner Wong
(74) *Attorney, Agent, or Firm* — Slater & Matsil, L.L.P.

(57) ABSTRACT

A method for measuring Inter-Frequency/Inter-RAT (Radio Access Technology) in Multimedia Broadcast/Multicast Service (MBMS) includes: setting an Inter-Frequency/Inter-RAT measurement time to prevent Inter-Frequency/Inter-RAT measurement time from overlapping constantly the transmission time of MCCH information; performing Inter-Frequency/Inter-RAT measurement by a UE according to the Inter-Frequency/Inter-RAT measurement time. In the present invention, the Inter-Frequency/Inter-RAT measurement time can be prevented from overlapping constantly the time when UTRAN transmits the MCCH information, so that the problem that the UE cannot receive MCCH information during Inter-Frequency/Inter-RAT measurement time may be solved. In the invention, a measurement time setting device is also provided for implementing Inter-Frequency/Inter-RAT measurement in Multimedia Broadcast/Multicast Service.

22 Claims, 4 Drawing Sheets

U.S. PATENT DOCUMENTS

| | | | |
|---|---|---|---|
| 2006/0034225 A1* | 2/2006 | Jung et al. | 370/331 |
| 2006/0039309 A1* | 2/2006 | Lee et al. | 370/312 |
| 2006/0146745 A1* | 7/2006 | Cai et al. | 370/328 |
| 2009/0023438 A1* | 1/2009 | Breuer et al. | 455/423 |
| 2009/0073892 A1* | 3/2009 | Tolli et al. | 370/252 |
| 2009/0219893 A1* | 9/2009 | Korpela et al. | 370/332 |
| 2010/0226274 A1* | 9/2010 | Burbidge et al. | 370/252 |

FOREIGN PATENT DOCUMENTS

| | | | |
|---|---|---|---|
| CN | 1578490 | | 2/2005 |
| CN | 1586087 | | 2/2005 |
| DE | EP1478198 | * | 11/2004 |
| EP | 1463358 | | 9/2004 |

OTHER PUBLICATIONS

3GPP TS 25.123 V6.3.0 (Sep. 2004), "3$^{rd}$ Generation Partnership Project; Technical Specification Group Radio Access Network; Requirements for support of radio resource management (TDD) (Release 6)", Sep. 2004, 246 pages.

3GPP TS 25.133 V6.7.0 (Sep. 2004), "3$^{rd}$ Generation Partnership Project; Technical Specification Group Radio Access Network; Requirements for support of radio resource management (FDD) (Release 6)", Sep. 2004, 175 pages.

3GPP TS 25.331 V6.4.0 (Dec. 2004), "3$^{rd}$ Generation Partnership Project; Technical Specification Group Radio Access Network; Radio Resource Control (RRC); Protocol Specification (Release 6)", Dec. 2004, 1157 pages.

3GPP TSG-RAN2 Meeting #46, Change Request 25.331 CR 2530, rev. 2, current version 6.4.0, Feb. 14-18, 2005, 72 pages, Scottsdale, Arizona, U.S.A.

3GPP TSG-RAN WG2 Meeting #46, Change Request 25.331 CR 2536, rev. 1, current version 6.4.0, Feb. 14-18, 2005, 221 pages, Phoenix, Arizona, U.S.A.

English Translation of the Written Opinion of the International Searching Authority, PCT/CN2006/000766, Date of mailing Aug. 10, 2006, 4 pages.

* cited by examiner

METHOD FOR MEASURING DIFFERENT FREQUENCIES/SYSTEMS IN MBMS AND A DEVICE FOR SETTING MEASURING TIME

CROSS REFERENCE TO RELATED APPLICATIONS

This application is National Stage Entry of International Application No. PCT/CN2006/000766, filed on Apr. 21, 2006, which claims priority to Chinese Patent Application No. 200510064770.3, filed on Apr. 21, 2005.

FIELD OF THE INVENTION

The present invention relates to Inter-Frequency/Inter-RAT measurement technologies on terminals in the 3rd generation (3G) Mobile Telecommunications Systems, and in particular, to a method for implementing Inter-Frequency/Inter-RAT measurement in Multimedia Broadcast/Multicast Service (MBMS) and a measurement time setting device.

BACKGROUND OF THE INVENTION

Universal Mobile Telecommunications System (UMTS) is a 3G Mobile Telecommunications System that employs Wideband Code Division Multiple Access (WCDMA) air interface technology. It is developed mainly in a WCDMA/GSM (Global System for Mobile Communications) Global Standardization Organization, Third Generation Partnership Project (3GPP).

In 3GPP UMTS Standards, a User Equipment (UE) may have two modes, an IDLE mode and an RRC Connected mode, according to whether a Radio Resource Control (RRC) connection is established. The UE on which the RRC connection is not established with a UMTS Universal Terrestrial Radio Access Network (UTRAN) is in an IDLE mode, and the UE in the IDLE mode can only be distinguished via a Non-Access Stratum (NAS) identification, such as International Mobile Subscriber Identity (IMSI). The UE on which RRC connection is established with the UTRAN is in the RRC Connected mode, and a Radio Network Temporary Identity (RNTI) is allocated to the UE in this mode as an identification of the UE on a common transport channel.

However, for the UE in the RRC Connected mode, it may have different states according to the hierarchy of RRC connection and the type of transport channel that can be used by the UE. The UE in a CELL_PCH state, a CELL_FACH state or a CELL_DCH state can be distinguished on cell hierarchy, and the UE in a URA_PCH state can be distinguished on UTRAN RegisterArea (URA) hierarchy. The UE in the CELL_DCH state is allocated a dedicated physical channel, and the UE can use a dedicated transport channel, a shared channel and a combination thereof. The UE in the CELL_FACH state is required to consecutively monitor a common transport channel (FACH, Forward Access Channel) downstream, and a default common channel (RACH, Reverse Access Channel) is allocated upstream. The UE in the CELL_PCH or the URA_PCH state monitors a Page Channel (PCH) via a related PICH (Page Indicator Channel) in a manner of Discontinuous Reception (DRX), and no upstream activities are performed by the UE in these two states.

In 3GPP UMTS Standards, when a UE is in different modes and states, cells with different frequencies are to be measured according to the measurement control information or system information received and the reception quality of the current cell, so that processes such as cell reselection and cell handover can be performed. The trigger condition for performing Inter-Frequency measurement by the UE in the IDLE state, CELL_PCH state, URA_PCH state or CELL_FACH state is the system information received and the reception quality of the current cell. However, the trigger condition for performing Inter-Frequency measurement by the UE in the CELL_DCH state is the measurement control information transmitted by the system. Usually, for a UE without double receivers, because receiving and decoding for signals with two different frequencies cannot be supported simultaneously, reception of signals in the current cell will be interrupted when Inter-Frequency measurement is performed by the UE.

At the same time, with the development of 3G mobile telecommunications technology, the demands for mobile telecommunications services of users are not just limited to voice service. Because the 3G mobile telecommunications system can provide a much higher data transmission rate than the second generation (2G) mobile telecommunications system can, a large number of multimedia services spring up, such as visual telephone, picture download and high-speed Internet surfing. Some application services require that a plurality of users can receive the same data simultaneously, such as video on-demand, television broadcast, video conference, online education and interactive games.

The concept of multicast and broadcast is introduced into the 3G mobile telecommunications system to effectively utilize mobile telecommunications network resources. Multicast and Broadcast Service is a technology to transfer the same data from one data source to a plurality of destinations. Therefore, the WCDMA/GSM Global Standardization Organization, 3GPP, puts forward Multimedia Broadcast/Multicast Service (MBMS), which means a Point to Multipoint service that sends the same data from one data source to a plurality of users on mobile telecommunications networks, so that network resources can be shared, and the utilization of network resources, especially the utilization of air interface resources, can be improved.

In the MBMS service, data transfer modes between a UE and a UTRAN can be classified into two types: a Point to Point (PTP) mode and a Point to Multipoint (PTM) mode. The PTP mode is used for MBMS multicast mode, and the UE in the RRC connection mode under multicast mode receives control information via a Dedicated Control Channel (DCCH) and receives data information via a Dedicated Traffic Channel (DTCH). The PTM mode is used for MBMS broadcast or multicast mode, and the UE in this mode receives data information via an MBMS point-to-multipoint Traffic Channel (MTCH) and receives control information via an MBMS point-to-multipoint Control Channel (MCCH).

In MBMS service, the control information is transmitted via an MCCH in the PTM mode and the MBMS control information provided on the MCCH includes service information, access information and wireless bearer information, etc. For simplicity, the MBMS control information provided on the MCCH is abbreviated as "MCCH information". The MCCH information can be classified into critical information and non-critical information. The critical information includes MBMS adjacent cell information, MBMS service information and MBMS wireless bearer information and the non-critical information includes MBMS access information.

Figure 1:
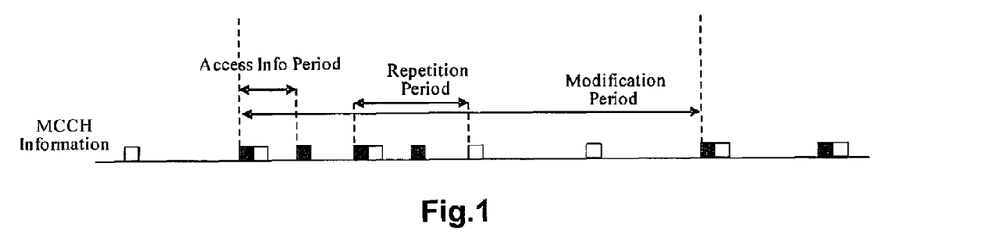
FIG. 1 is a schematic diagram showing the correlation among the "Repetition Period", "Modification Period" and "Access Info Period" during the time when the MCCH information is sent by a UTRAN.

The MCCH information is transmitted using a fixed schedule, and is transmitted periodically based on a "Repetition Period" to improve reception reliability. A "Modification Period" is an integral multiple of the "Repetition Period". The critical information can only be modified during the Modification Period when the MCCH information is transmitted for the first time. MBMS modification information will be transmitted by the UTRAN at the beginning of each Modification Period. The modification information includes the MBMS service identification of the MCCH information modified in the Modification Period. The MBMS modification information is repeated at least once during each Repetition Period of the Modification Period; However, the non-critical information can be modified at any time. Further, the MBMS access information is transmitted periodically based on an "Access Info Period" which is an integral multiple of the "Access Info Period". FIG. 1 is a schematic diagram showing the correlation among the "Repetition Period", "Modification Period" and "Access Info Period" during the time when the MCCH information is transmitted by the UTRAN.

The values of the Modification Period, the Access Info Period and the Repetition Period are successive as follows:

Modification Period: The range of coefficient m is (7 ... 10), and a Modification Period MP=$2^m$×frame length.

Access Info Period: The range of coefficient a is (0 ... 3), and a Access Info Period AIP=(MP/$2^a$)×frame length.

Repetition Period: The range of coefficient r is (0 ... 3), and Repetition Period RP=(MP/$2^r$)×frame length.

In a cell, a UE obtains information of related MBMS service by receiving the MCCH information, obtains the access information of the desired services by receiving access information in the MCCH information, and sends MBMS service request information to the UTRAN according to the access information.

When in the CELL_FACH state, the UE performs the Inter-Frequency measurement during the frame(s) with the frame System Frame Number (SFN) fulfilling the following equation:

$$\text{SFN div } N = C\_RNTI \bmod M\_REP + n \times M\_REP \quad (1)$$

Where

N represents the number of 10 ms frames of Transmission Timing Interval (TTI) of the Forward Access Channel (FACH) having the largest TTI on Secondary Common Control Physical Channel (SCCPCH) that bears non-MBMS logical channels, and the SCCPCH is monitored by the UE;

M_REP represents a measurement occasion cycle length, and M_REP=$2^k$. According to the above equation (1), the Repetition Period of the measurement occasion of N frames is N×M_REP frames;

Where, k is the coefficient of FACH measurement occasion cycle length, which is read from the information element "FACH measurement occasion info" contained in system information 11 or system information 12;

C_RNTI (cell radio network temporary identity) is the C-RNTI value of the UE; and n=0, 1, 2 ..., as long as SFN is less than its maximum value.

The corresponding values of N and k are:

| $N_{TTI}$ | k |
|---|---|
| 1 | 3, 4, 5, 6 |
| 2 | 2, 3, 4, 5 |

Therefore, the UE can obtain an SFN which fulfills the condition defined by the above equation 1 by calculating according to equation (1), and perform Inter-Frequency measurement on the SFN, and interrupt the reception of the MBMS of current cell during Inter-Frequency measurement.

Because the minimum value of the "Access Info Period" for a UTRAN to transmitted the MCCH information is 0.16 s, the values in the numeric area are all multiples of this minimum value; and according to the above equation (1), when the FACH TTI of a UE in the CELL_FACH state is 10 ms and k=3, Inter-Frequency measurement is performed once every 80 ms, and the measurement duration is 10 ms. As a result, the following problems may appear:

(1) The time for Inter-Frequency measurement of some UEs overlaps constantly the time when a UTRAN transmits the MCCH information, and because the UE needs to perform Inter-Frequency measurement during this overlapping time, the UE cannot receive important MCCH information in this overlapping time.

(2) To avoid the problem in (1), the time for Inter-Frequency measurement of the UE may be prevented from overlapping constantly the transmission time of the MCCH information by the UTRAN via changing the C-RNTI of the UE, but when there are too many UEs performing Inter-Frequency measurement, considering the difference among the transmission time points of the MCCH information in each cell, the UTRAN needs to modify the C-RNTI of each UE so as to avoid the problem that the time for Inter-Frequency measurement of each UE overlaps constantly the transmission time of the MCCH information. As a result, the allocation and schedule complexity of the UTRAN may be increased.

When in the IDLE state, CELL_PCH state and URA_PCH state, when the UE supports DRX function, Inter-Frequency should be measured at least every (Ncarrier-1)×TmeasureFDD when performing Inter-Frequency measurement. Parameter Ncarrier refers to the number of different frequencies measured; the final Inter-Frequency measurement value should be obtained by the terminal by averaging at least two Inter-Frequency measurement values, and in the Inter-Frequency measurement values for averaging, there should be at least two measured values whose interval is at least TmeasureFDD/2. The corresponding parameters are specifically as follows:

| DRX cycle length [s] | 0.08 | 0.16 | 0.32 | 0.64 | 1.28 | 2.56 | 5.12 |
|---|---|---|---|---|---|---|---|
| Tmeasure FDD[s] (number of DRX cycles) | 0.64 (8 DRX cycles) | 0.64 (4) | 1.28 (4) | 1.28 (2) | 1.28 (1) | 2.56 (1) | 5.12 (1) |

Therefore, if the UE supports a MBMS service in the IDLE state, CELL_PCH state or URA_PCH state, when Inter-Frequency measurement is to be performed, the UE needs to perform Inter-Frequency measurement periodically, so as to obtain an Inter-Frequency measurement value. When UE without double receivers performs Inter-Frequency measurement, the reception of the current cell MBMS service may also be interrupted.

It can be seen from the above table that a multiple relation exists between the period in which UE performs Inter-Frequency measurement to obtain an Inter-Frequency measurement value and the period in which a UTRAN transmits the MCCH information, and the UE does not consider the relation with the transmission time of the MCCH information when setting sampling time points of Inter-Frequency measurement. As a result, the sampling time of Inter-Frequency measurement performed by UE may overlap constantly the transmission time of the MCCH information, so the UE may never receive important and requisite MCCH information.

Figure 2:
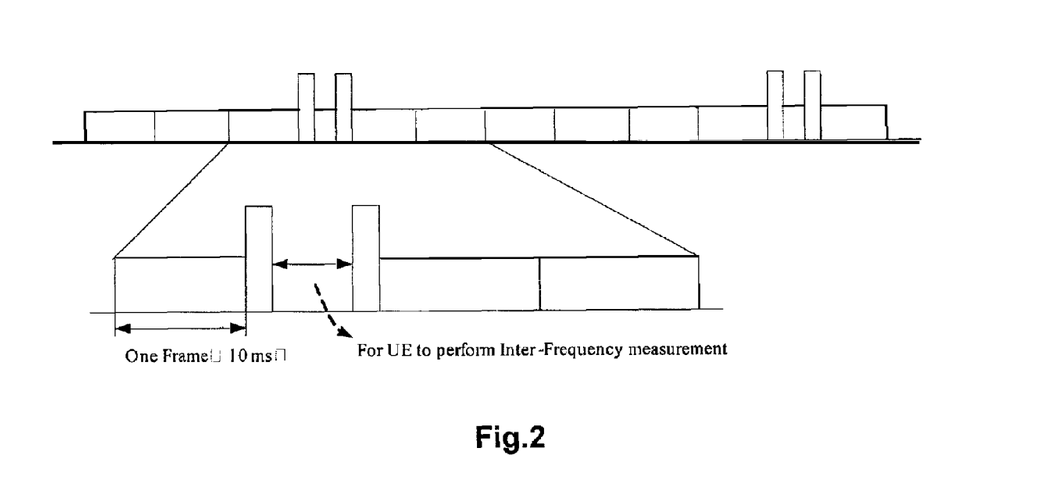
FIG. 2 is a schematic diagram showing a technical principle of an existing compressed mode.

In the CELL_DCH state, a WCDMA FDD terminal performs Inter-Frequency measurement in a compressed mode indicated by the UTRAN, and the technical principle of the compressed mode is as shown in FIG. 2, i.e. data transmission rate will be increased when the UTRAN sends some frames (data sent every 10 ms is referred to as 1 frame), and the data sent in 10 ms originally will now be sent in a time of less than 10 ms, so that the spared time will be used by the UE to perform Inter-Frequency measurement. It is controlled by the UTRAN completely how and when to increase the transmission rate.

When the WCDMA FDD terminal receives MBMS PTM service in the CELL_DCH state, the UTRAN controls the UE to perform Inter-Frequency measurement by transmitting information bearing the compressed mode. If it's supported to receive MBMS control information on MCCH by the UE, when the UE without double receivers performs Inter-Frequency measurement, reception of the current cell MCCH information may be interrupted; and the time for performing Inter-Frequency measurement is entirely indicated by the compressed mode information sent by the UTRAN.

However, when the compressed mode of UE Inter-Frequency measurement is configured by the UTRAN, the transmission period of the MCCH information is not considered at all. Since the compressed mode information is used by the UE repeatedly and the MCCH information is also periodically transmitted, the Inter-Frequency measurement time indicated by the compressed mode may overlap constantly the transmission time of the MCCH information. As a result, the UE may never receive important and requisite MCCH information when performing Inter-Frequency measurement in the Inter-Frequency measurement time designated by the UTRAN.

The problems existing during the Inter-Frequency measurement performed by the UE in the above various states also occur when Inter-RAT measurement is performed.

SUMMARY OF THE INVENTION

The present invention is to provide a method for implementing Inter-Frequency/Inter-RAT measurement in Multimedia Broadcast/Multicast Service (MBMS) and a measurement time setting device to prevent Inter-Frequency/Inter-RAT measurement time from overlapping constantly the time when a Universal Terrestrial Radio Access Network (UTRAN) transmits MBMS point-to-multipoint Control Channel (MCCH) information. Therefore, a User Equipment (UE) can receive the MCCH information during Inter-Frequency/Inter-RAT measurement.

The embodiments of the invention provide following technical solutions. A method for implementing Inter-Frequency/Inter-RAT measurement in MBMS, includes: setting a time of inter-frequency/inter-RAT measurement based on a transmission time of MBMS point-to-multipoint Control Channel (MCCH) information; and performing, by a user equipment, inter-frequency/inter-RAT measurement according to the time of inter-frequency/inter-RAT measurement set. The time of inter-frequency/inter-RAT measurement set does not overlap constantly the transmission time of the MCCH information.

An embodiment of the present invention further provides a device for setting time of inter-frequency/inter-RAT measurement in Multimedia Broadcast/Multicast Service (MBMS) including: an obtaining unit, configured to obtain a transmission time of MBMS point-to-multipoint Control Channel (MCCH) information from system information transmitted by a Universal Terrestrial Radio Access Network (UTRAN); and a setting unit, configured to set a time of inter-frequency/inter-RAT measurement not overlapping constantly the transmission time of the MCCH information in which a user equipment performs inter-frequency/inter-RAT measurement. The device is arranged in the user equipment.

An embodiment of the present invention further provides a device for setting time of inter-frequency/inter-RAT measurement in MBMS, including: a setting unit, configured to set a time of inter-frequency/inter-RAT measurement, where the time of inter-frequency/inter-RAT measurement does not overlap constantly the transmission time of the MCCH information; and a sending unit, configured to send the time of inter-frequency/inter-RAT measurement set to the user equipment, so as to instruct the user equipment the time to perform inter-frequency/inter-RAT measurement. The device is located in a UTRAN.

An embodiment of the present invention further provides a user equipment for implementing inter-frequency/inter-RAT measurement in a MBMS, including: a measurement time unit, configured to set a measurement time or obtain the measurement time set by a UTRAN, according a transmission time of MCCH information transmitted by the UTRAN, the measurement time does not overlap constantly the transmission time of MCCH information transmitted by the UTRAN; a performing unit, configured to perform inter-frequency/inter-RAT measurement according to the measurement time obtained.

In the present invention, the Inter-Frequency/Inter-RAT measurement time, which is prevented from overlapping constantly the transmission time of the MCCH information, is set for Inter-Frequency/Inter-RAT measurement by a UE according to the time when a UTRAN transmits the MCCH information; or, a UTRAN sets the Inter-Frequency/Inter-RAT measurement time that is prevented from overlapping constantly the transmission time of the MCCH information according to the time it transmits the MCCH information, and designates the Inter-Frequency/Inter-RAT measurement time that is set to UE, for Inter-Frequency/Inter-RAT measurement. As a result, the time for the UE to perform Inter-Frequency/Inter-RAT measurement may be prevented from overlapping constantly the time when the UTRAN transmits the MCCH information, so that the UE may be able to receive the MCCH information when performing Inter-Frequency/Inter-RAT measurement, and it is favorable for the development of MBMS service.

DETAILED DESCRIPTION OF THE EMBODIMENTS

In the prior art, because the Inter-Frequency/Inter-RAT measurement time overlaps constantly the time when a Universal Terrestrial Radio Access Network (UTRAN) transmits MBMS point-to-multipoint Control Channel (MCCH) information when User Equipment (UE) does not have double receivers, the UE can not receive important and necessary Multimedia Broadcast/Multicast Service (MBMS) messages when performing Inter-Frequency/Inter-RAT measurement. But in the method for performing Inter-Frequency/Inter-RAT measurement in MBMS according to the embodiments of the invention, it is put forward that for a UE without double receivers, the Inter-Frequency/Inter-RAT measurement time is determined and controlled by the UE, or the UE is scheduled by the UTRAN to control the Inter-Frequency/Inter-RAT measurement time, so that the measurement time can be prevented from overlapping constantly the transmission time of the MCCH information. Therefore, the UE can perform Inter-Frequency/Inter-RAT measurement in the measurement time and receive necessary MCCH information during the MCCH information transmission.

Figure 3:
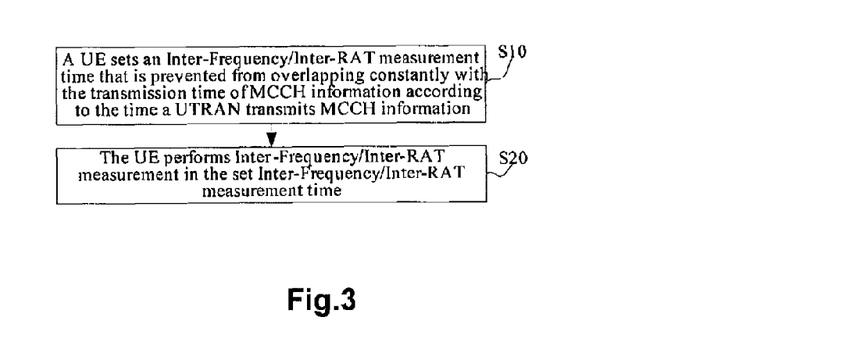
FIG. 3 is a flow chart of a main implementation principle according to an embodiment of the invention.

FIG. 3 is a flow chart showing the main implementation principle according to an embodiment of the invention In S10: A UE sets an Inter-Frequency/Inter-RAT measurement time that do not overlap constantly the transmission time of MCCH information according to the time when a UTRAN transmits the MCCH information.

Step S20: The UE performs Inter-Frequency/Inter-RAT measurement in the above set Inter-Frequency/Inter-RAT measurement time.

The UE may obtain the transmission time of the MCCH information from system information transmitted by the UTRAN. The system information transmitted by the UTRAN includes the schedule information of the MCCH information and Inter-Frequency/Inter-RAT measurement information. The schedule information includes transmission time of the MCCH information, Modification Period during the MCCH information transmission, Access Info Period and Repetition Period, etc. While the Inter-Frequency/Inter-RAT measurement information includes various information for triggering an Inter-Frequency/Inter-RAT measurement.

Figure 4:
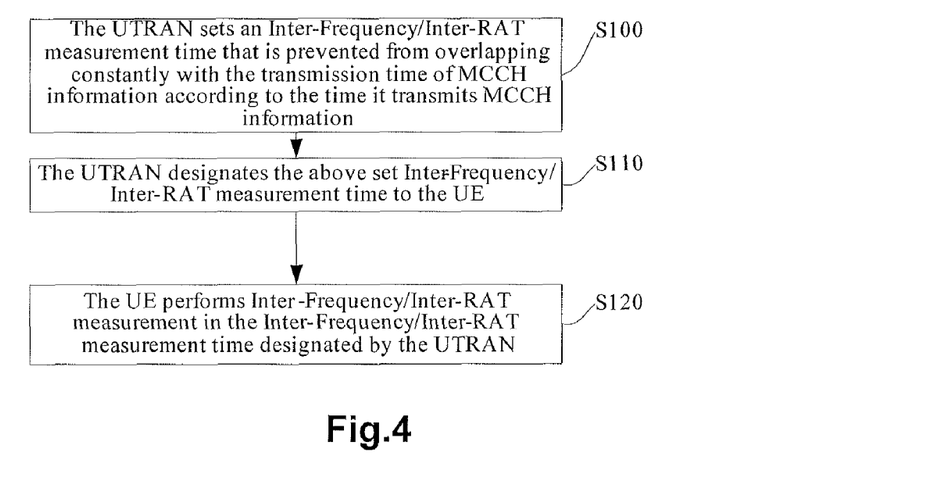
FIG. 4 is a flow chart of a main implementation principle according to another embodiment of the invention.

FIG. 4 is a flow chart showing the main implementation principle according to another embodiment of the invention S100: A UTRAN sets an Inter-Frequency/Inter-RAT measurement time which do not overlap constantly the transmission time of MCCH information according to the time when the UTRAN transmits the MCCH information.

S110: The UTRAN designates the Inter-Frequency/Inter-RAT measurement time set in S100 to UE;

S120: The UE performs Inter-Frequency/Inter-RAT measurement in the Inter-Frequency/Inter-RAT measurement time designated by the UTRAN.

Figure 5:
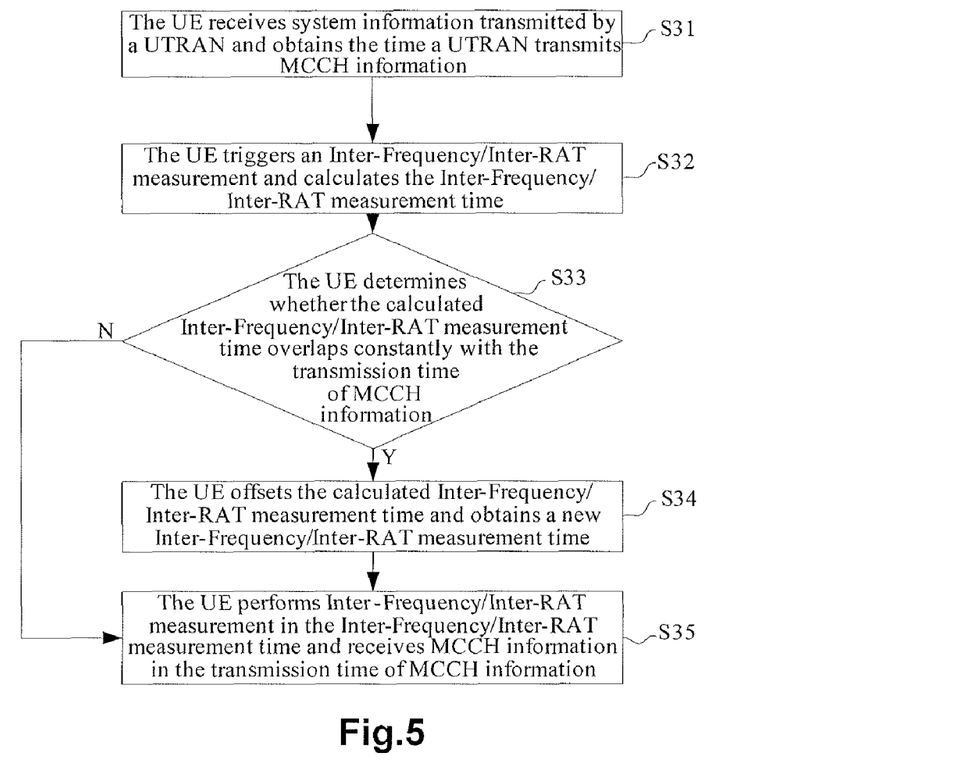
FIG. 5 is a flow chart of a process for implementing the setting of an Inter-Frequency/Inter-RAT measurement time by a UE when the UE is in a CELL_FACH state.

FIG. 5 shows the main flow-chart for implementing inter-frequency/inter-RAT measurement according to an embodiment. In this embodiment, the UE is in a CELL_FACH state.

S31: A UE obtains the transmission time when a UTRAN transmits MCCH information from the system information transmitted by the UTRAN (the UTRAN will transmit schedule information of an MCCH to the UE, and the schedule information includes Transmission Time of the MCCH information, Modification Period, Access Info Period and Repetition Period, etc);

S32: The UE triggers an Inter-Frequency/Inter-RAT measurement process and calculates the Inter-Frequency/Inter-RAT measurement time of the UE, where the Inter-Frequency/Inter-RAT measurement time of the UE is calculated according to the following equation:

$$SFN=(C\_RNTI \bmod M\_REP + n \times M\_REP) \times N$$

The UE performs Inter-Frequency/Inter-RAT measurement in the frame whose SFN meets the above equation;

Where, N is the number of 10 ms frames of Transmission Timing Interval (TTI) of the Forward Access Channel (FACH) having the largest TTI on Secondary Common Control Physical Channel (SCCPCH) that bears non-MBMS logical channels, and the SCCPCH is monitored by the UE;

M_REP is a measurement occasion cycle length, $M\_REP=2^k$, and the Repetition Period of the measurement time of N frames is N×M_REP frames; here k is the coefficient of FACH measurement occasion cycle length, which is read from the "FACH measurement occasion info" contained in system information 11 or 12;

C_RNTI (Cell Radio Network Temporary Identity) is the C-RNTI value of the UE; and n=0, 1, 2 . . . , as long as SFN is less than its maximum value.

S33: The UE determines whether its Inter-Frequency/Inter-RAT measurement time overlaps constantly the time when the UTRAN transmits the MCCH information, after the Inter-Frequency/Inter-RAT measurement time of the UE is calculated; if yes, turn to Step S34; otherwise, turn to Step S35;

S34: The UE shifts the above calculated Inter-Frequency/Inter-RAT measurement time and obtains a new Inter-Frequency/Inter-RAT measurement time; here, it is hypothesized that the offset time value is Measurement Offset. The offset time value, Measurement Offset, may be generated randomly by the UE, and the magnitude of the offset time value, Measurement Offset, is an integral multiple of the number of frames contained in the TTI of an FACH with the maximum TTI that bears non-MBMS logical channels which is monitored by the UE in a CELL_FACH state, and it is ensured that the new Inter-Frequency/Inter-RAT measurement time will not overlap constantly the transmission time of the MCCH information.

In addition, the offset value, Measurement Offset, may also be generated by the UTRAN and broadcast to the UE, and the magnitude of the offset time value, Measurement Offset, is an integral multiple of the number of frames contained in the TTI of an FACH with the maximum TTI that bears non-MBMS logical channels which is monitored by the UE in the CELL_FACH state, and it is ensured that the new Inter-Frequency/Inter-RAT measurement time will not overlap constantly the transmission time of the MCCH information. The Inter-Frequency/Inter-RAT measurement time after the offset should meet the requirements of the following equation:

$$SFN=(C\_RNTI \bmod M\_REP+n*M\_REP)*N+\text{Measurement Offset}.$$

S35: The UE receives the MCCH information in the time the UTRAN transmits the MCCH information, and performs Inter-Frequency/Inter-RAT measurement in the Inter-Frequency/Inter-RAT measurement time.

Figure 6:
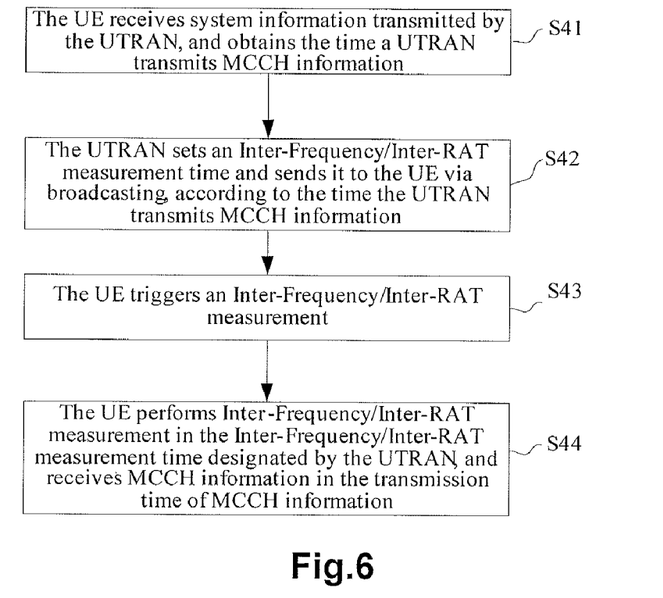
FIG. 6 is a flow chart of a process for implementing the setting of an Inter-Frequency/Inter-RAT measurement time by a UTRAN when the UE is in a CELL_FACH state.

In addition, when the UE is in the CELL_FACH state, the Inter-Frequency/Inter-RAT measurement time may also be set by the UTRAN, and the specific implementation process is as shown in FIG. 6. This process is used for the Inter-Frequency measurement performed by a UE in the CELL_FACH state when MBMS is supported, and its main implementation process is as follows:

S41: The UE receives system information transmitted by the UTRAN, and obtains the time the UTRAN transmits MCCH information from the system information (the UTRAN will transmit schedule information of an MCCH to the UE, and the schedule information includes Transmission Time of the MCCH information, Modification Period, Access Info Period and Repetition Period, etc);

S42: The UTRAN sets an Inter-Frequency/Inter-RAT measurement time that is prevented from overlapping constantly the transmission time of the MCCH information according to the time when the UTRAN transmits the MCCH information, and sends the Inter-Frequency/Inter-RAT measurement time that is set to the UE via broadcasting;

Step S43: The UE triggers an Inter-Frequency/Inter-RAT measurement;

In S44: The UE performs Inter-Frequency/Inter-RAT measurement in the Inter-Frequency/Inter-RAT measurement time designated by the UTRAN, and performs Inter-Frequency/Inter-RAT measurement once every N×M_REP frames, here every measurement duration equals to the TTI of an FACH with the maximum TTI that bears non-MBMS logical channels which is monitored by the UE; and the UE receives the MCCH information in the time the UTRAN transmits the MCCH information.

Figure 7:
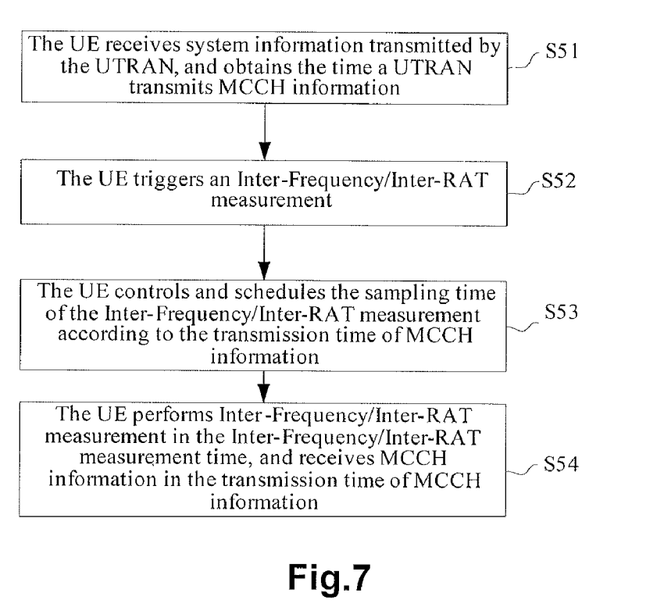
FIG. 7 is a flow chart of a process for implementing the setting of an Inter-Frequency/Inter-RAT measurement time by a UE when the UE is in an IDLE state, CELL_PCH state or URA_PCH state.

When the UE is in the IDLE state, CELL_PCH state or URA_PCH state, the Inter-Frequency/Inter-RAT measurement time is set by the UE, and the specific implementation process is as shown in FIG. 7. This process is used for the Inter-Frequency measurement process performed by UE in the IDLE state, CELL_PCH state or URA_PCH state when MBMS is supported, and the main implementation process is as follows:

S51: The UE receives system information transmitted by the UTRAN, and obtains the time a UTRAN transmits MCCH information from the system information;

S52: The UE triggers an Inter-Frequency/Inter-RAT measurement;

S53: The UE controls and schedules the sampling time of the Inter-Frequency/Inter-RAT measurement according to the time the UTRAN transmits the MCCH information, so that the Inter-Frequency/Inter-RAT measurement time of the UE will not overlap constantly the transmission time of the MCCH information;

S54: The UE performs Inter-Frequency/Inter-RAT measurement in the Inter-Frequency/Inter-RAT measurement time, and receives the MCCH information in the transmission time of the MCCH information.

Figure 8:
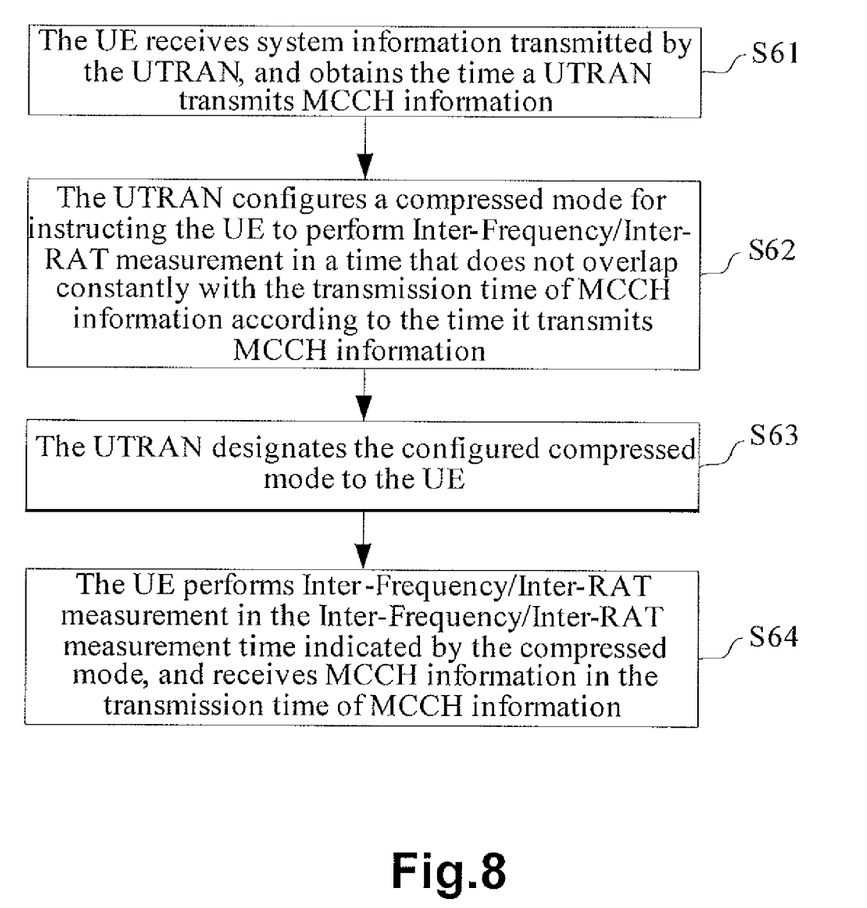
FIG. 8 is a flow chart of a process for implementing the setting of an Inter-Frequency/Inter-RAT measurement time by a UTRAN when the WCDMA FDD UE is in a CELL_DCH state.

When the WCDMA FDD UE is in a CELL_DCH state, the Inter-Frequency/Inter-RAT measurement time is set by the UTRAN, and the specific implementation process is as shown in FIG. 8. This process is used for the Inter-Frequency measurement performed by an WCDMA FDD UE in the CELL_DCH state when MBMS is supported and when receiving MBMS control information on an MCCH is supported, and its main implementation process is as follows:

S61: The UE receives system information transmitted by the UTRAN, and obtains the time the UTRAN transmits MCCH information from the system information;

S62: The UTRAN sets an Inter-Frequency/Inter-RAT measurement time that is prevented from overlapping constantly the transmission time of the MCCH information according to the time when the UTRAN transmits the MCCH information, and configures a compressed mode for instructing the UE to perform Inter-Frequency/Inter-RAT measurement according to the Inter-Frequency/Inter-RAT measurement time which is set; that is, the compressed mode is configured by the UTRAN in consideration of the transmission time of the MCCH information, so that it is ensured that the Inter-Frequency/Inter-RAT measurement time indicated by the compressed mode will not overlap constantly the transmission time of the MCCH information;

S63: The UTRAN designates the above configured compressed mode to the UE;

Step S64: The UE performs Inter-Frequency/Inter-RAT measurement in the Inter-Frequency/Inter-RAT measurement time indicated by the compressed mode designated by the UTRAN, and receives the MCCH information in the transmission time of the MCCH information.

Therefore, by integrating the above processes, it may be prevented that UE in different states will never receive important and requisite MBMS messages due to the Inter-Frequency/Inter-RAT measurement.

Additionally, according to the embodiments of the invention, there is further provided a measurement time setting device for implementing Inter-Frequency/Inter-RAT measurement in Multimedia Broadcast/Multicast Service (MBMS), which sets the time for UE to perform Inter-Frequency/Inter-RAT measurement so that it is prevented from overlapping constantly the transmission time of MCCH information.

When the UE is in the CELL_FACH state, the device may be arranged in the UE, and the device includes:

an obtaining unit, for obtaining the transmission time of the MCCH information;

a calculating unit, for calculating the Inter-Frequency/Inter-RAT measurement time of the UE; and a shifting unit, for shifting the Inter-Frequency/Inter-RAT measurement time obtained by calculation and taking it as the Inter-Frequency/Inter-RAT measurement time that is to be set, when the Inter-Frequency/Inter-RAT measurement time obtained by calculation overlaps constantly the transmission time of the MCCH information.

The calculating unit computes its Inter-Frequency/Inter-RAT measurement time according to the following equation:

$$SFN=(C\_RNTI \bmod M\_REP+n \times M\_REP) \times N$$

N is the number of 10 ms frames of Transmission Timing Interval (TTI) of the Forward Access Channel (FACH) having the largest TTI on Secondary Common Control Physical Channel (SCCPCH) that bears non-MBMS logical channels, and the SCCPCH is monitored by the UE;

M_REP is a measurement occasion cycle length, $M\_REP=2^k$, and the Repetition Period of the measurement time of N frames is N×M_REP frames; here k is the coefficient of FACH measurement occasion cycle length, which is read from FACH measurement occasion info contained in system information 11 or 12;

C_RNTI is the Cell Radio Network Temporary Identity (C_RNTI) value of the UE; and n=0, 1, 2, . . . as long as SFN is less than its maximum value.

The shifting unit includes an offset value generating unit, for randomly generating an offset value that is used for shifting the Inter-Frequency/Inter-RAT measurement time, and the offset value is an integral multiple of the number of frames contained in the TTI of the FACH with the maximum TTI that bears non-MBMS logical channels which is monitored by the UE.

The offset value generating unit may be arranged in the UE, or it may be arranged in the UTRAN.

When the UE is in the CELL_FACH state, the device may be arranged in the UTRAN, and the device includes:

an obtaining unit, for obtaining the transmission time of the MCCH information;

a setting unit, for setting the Inter-Frequency/Inter-RAT measurement time of the UE; and a designating unit, for designating the Inter-Frequency/Inter-RAT measurement time that is set to the UE via broadcasting.

In such a case, the duration of Inter-Frequency/Inter-RAT measurement performed by the UE in the Inter-Frequency/Inter-RAT measurement time designated by the device is the TTI of an FACH with the maximum TTI that bears non-MBMS logical channels which is monitored by the UE, and each measurement interval is N×M_REP, here M_REP is measurement occasion cycle length, $M\_REP=2^k$, and k is the coefficient of FACH measurement occasion cycle length, which is read from FACH measurement occasion info contained in system information 11 or 12.

When the UE is in the IDLE state, CELL_PCH state or URA_PCH state, the device may be arranged in the UE, and the device includes: an obtaining unit, for obtaining the transmission time of the MCCH information; and a controlling unit, for controlling and scheduling the sampling time of the Inter-Frequency/Inter-RAT measurement, so as to set the Inter-Frequency/Inter-RAT measurement time that is prevented from overlapping constantly the transmission time of the MCCH information.

When the WCDMA FDD UE is in a CELL_DCH state, the device may be arranged in the UTRAN, and the device includes:

an obtaining unit, for obtaining the transmission time of the MCCH information;

a setting unit, for setting the Inter-Frequency/Inter-RAT measurement time of the UE;

a configuring unit, for configuring a compressed mode for instructing the UE to perform Inter-Frequency/Inter-RAT measurement according to the Inter-Frequency/Inter-RAT measurement time which is set; and a designating unit, for designating the configured compressed mode to the UE.

In such a case, the UE performs Inter-Frequency/Inter-RAT measurement in the Inter-Frequency/Inter-RAT measurement time indicated by the compressed mode designated by the device.

The device may be arranged in the UE, for obtaining the time the UTRAN transmits the MCCH information from the system information transmitted by the UTRAN; or, the device may be arranged in the UTRAN, for internally obtaining the time the UTRAN transmits the MCCH information.

Additional variations and modifications will readily occur to those skilled in the art. Therefore, the invention in its broader aspects is not limited to the specific details and representative embodiments shown and described herein. Accordingly, various variations and modifications may be made without departing from the spirit or scope of the invention as defined by the appended claims and their equivalents.

What is claimed is:

1. A method for implementing Inter-Frequency/Inter-RAT (Radio Access Technology) measurement in Multimedia Broadcast/Multicast Service (MBMS), comprising:

setting a time of inter-frequency/inter-RAT measurement based on a transmission time of MBMS point-to-multipoint Control Channel (MCCH) information; and performing, by a user equipment, inter-frequency/inter-RAT measurement according to the time of inter-frequency/inter-RAT measurement set;

wherein the time of inter-frequency/inter-RAT measurement set does not overlap constantly with the transmission time of the MCCH information.

2. The method according to claim 1, wherein setting the time of inter-frequency/inter-RAT measurement is implemented by the user equipment, the method further comprises: obtaining, by the user equipment, the transmission time of the MCCH information from system information transmitted by a Universal Terrestrial Radio Access Network (UTRAN).

3. The method according to claim 1, wherein setting the time of inter-frequency/inter-RAT measurement is implemented by a UTRAN, the method further comprises: designating, by the UTRAN, the time of inter-frequency/inter-RAT measurement to the user equipment.

4. A method for implementing Inter-Frequency/Inter-RAT (Radio Access Technology) measurement in Multimedia Broadcast/Multicast Service (MBMS), comprising:

setting a time of inter-frequency/inter-RAT measurement based on a transmission time of MBMS point-to-multipoint Control Channel (MCCH) information; and performing, by a user equipment, inter-frequency/inter-RAT measurement according to the time of inter-frequency/inter-RAT measurement set, wherein the time of inter-frequency/inter-RAT measurement set does not overlap constantly with the transmission time of the MCCH information, wherein setting the time of inter-frequency/inter-RAT measurement is implemented by the user equipment when the user equipment is in a CELL_FACH state, the method further comprises:

obtaining, by the user equipment, the transmission time of the MCCH information from a system information transmitted by a UTRAN, setting the time of inter-frequency/inter-RAT measurement comprises:

triggering, by the user equipment, the Inter-Frequency/Inter-RAT measurement and calculating an inter-frequency/inter-RAT measurement occasion;

shifting, by the user equipment, the calculated measurement occasion by an offset to obtain a shifted measurement time, if the calculated measurement occasion overlaps constantly the transmission time of the MCCH information; and taking, by the user equipment, the shifted time as the time of the inter-frequency/inter-RAT measurement.

5. The method according to claim 4, wherein calculating the measurement occasion comprises:

calculating, by the user equipment, an SFN fulfilling the following equation $$SFN=(C\_RNTI \bmod M\_REP+n \times M\_REP) \times N$$

wherein

N is the number of 10 ms frames of Transmission Timing Interval of the Forward Access Channel having the largest Transmission Timing Interval on Secondary Common Control Physical Channel (SCCPCH) bearing non-MBMS logical channel, the SCCPCH is monitored by the user equipment, M_REP is a measurement occasion cycle length, $M\_REP=2^k$ and a Repetition Period of the measurement occasion of N frames is N×M_REP frames, wherein k is a coefficient of FACH measurement occasion cycle length, which is read from FACH measurement occasion info contained in system information 11 or system information 12;

Cell Radio Network Temporary Identity, C_RNTI, is the C_RNTI value of the UE, and n=0, 1, 2, . . . , as long as the SFN is below the maximum value of n;

determining, by the user equipment, a frame with the calculated SFN as the measurement occasion.

6. The method according to claim 4, wherein the value of the offset is generated by the user equipment randomly, or is generated and transmitted to the user equipment by broadcast, and the value of the offset is equal to an integral multiple of the number of frames contained in a Transmission Timing Interval (TTI) of the Forward Access Channel having the largest TTI on Secondary Common Control Physical Channel (SCCPCH) bearing non-MBMS logical channel, the SCCPCH is monitored by the user equipment.

7. The method according to claim 1, wherein setting the time of inter-frequency/inter-RAT measurement is implemented by a UTRAN when the user equipment is in a CELL_FACH state, the method further comprises: designating the measurement time, by the UTRAN, to the user equipment by broadcast.

8. The method according to claim 7, wherein performing inter-frequency/inter-RAT measurement comprises:

performing, by the user equipment, the inter-frequency/inter-RAT measurement once every N×M_REP frames, wherein, M_REP is a measurement occasion cycle length and $M\_REP=2^k$, in which k is the coefficient of FACH measurement occasion cycle length, the value of the coefficient being read from FACH measurement occasion info contained in system information 11 or system information 12, wherein a duration for every measurement equals to a TTI of the Forward Access Channel (FACH) having the largest Transmission Timing Interval on Secondary Common Control Physical Channel (SCCPCH) bearing non-MBMS logical channel, the SCCPCH is monitored by the user equipment.

9. The method according to claim 1, wherein setting the time of inter-frequency/inter-RAT measurement is implemented by the user equipment if the user equipment is in an IDLE state, a CELL_PCH state or a URA_PCH state, the method further comprises:

obtaining, by the user equipment, the transmission time of the MCCH information from a system information transmitted by a UTRAN, wherein setting the time of inter-frequency/inter-RAT measurement is implemented by the user equipment by controlling and scheduling a sampling time of the Inter-Frequency/Inter-RAT measurement.

10. The method according to claim 1, wherein setting the time of inter-frequency/inter-RAT measurement is implemented by a UTRAN if the user equipment is a WCDMA FDD user equipment and is in a CELL_DCH state, the method further comprises:

configuring, by the UTRAN, according to the transmission time of the MCCH information, a compressed mode containing the measurement time for instructing the user equipment to perform the Inter-Frequency/Inter-RAT measurement in the time of inter-frequency/inter-RAT measurement; and designating, by the UTRAN, the configured compressed mode to the user equipment.

11. The method according to claim 1, further comprising:

receiving, by the user equipment, the MCCH information during the transmission time of the MCCH information from a UTRAN.

12. A device for setting time of inter-frequency/inter-RAT measurement in Multimedia Broadcast/Multicast Service (MBMS), the device comprising:

an obtaining unit, configured to obtain a transmission time of MBMS point-to-multipoint Control Channel (MCCH) information from system information transmitted by a Universal Terrestrial Radio Access Network (UTRAN); and a setting unit, configured to set a time of inter-frequency/inter-RAT measurement not overlapping constantly with the transmission time of the MCCH information in which a user equipment performs inter-frequency/inter-RAT measurement, wherein the device is arranged in the user equipment.

13. The device according to claim 12, wherein the setting unit comprises:

a calculating unit, configured to calculate an inter-frequency/inter-RAT measurement occasion; and a shifting unit, configured to shift the measurement occasion calculated by an offset to obtain a shifted time, and to take the shifted time as the time of inter-frequency/inter-RAT measurement.

14. The device according to claim 13, wherein the shifting unit comprises:

a generating unit, configured to generate the value of the offset used for shifting the measurement occasion, the value of the offset being equal to an integral multiple of the number of frames contained in a TTI of the Forward Access Channel with a maximal Transmission Timing Interval on Secondary Common Control Physical Channel (SCCPCH) bearing non-MBMS logical channel, the SCCPCH is monitored by the user equipment.

15. The device according to claim 13, wherein the shifting unit is configured to receive the value of the offset generated and transmitted by a UTRAN used for shifting the measurement occasion.

16. The device according to claim 12, wherein the setting unit sets the time of inter-frequency/inter-RAT measurement by controlling and scheduling a sampling time of the inter-frequency/inter-RAT measurement of the user equipment, so as to ensure that the measurement time does not overlap constantly the transmission time of MCCH information.

17. A device for setting time of inter-frequency/inter-RAT (Radio Access Technology) measurement in Multimedia Broadcast/Multicast Service (MBMS) comprising:
 a setting unit, configured to set a time of inter-frequency/inter-RAT measurement, wherein the time of inter-frequency/inter-RAT measurement does not overlap constantly with the transmission time of the MBMS point-to-multipoint Control Channel (MCCH) information; and
 a sending unit, configured to send the time of inter-frequency/inter-RAT measurement set to the user equipment, so as to instruct the user equipment the time to perform inter-frequency/inter-RAT measurement,
 wherein the device is located in a Universal Terrestrial Radio Access Network (UTRAN).

18. The device according to claim 17, wherein the device further comprises:
 a configuring unit, adapted to configure a compressed mode containing information of the time of inter-frequency/inter-RAT measurement for instructing the user equipment to perform the inter-frequency/inter-RAT measurement,
 the sending unit sends the time of inter-frequency/inter-RAT measurement to the user equipment by designating the compressed mode to the user equipment.

19. A user equipment for implementing inter-frequency/inter-RAT measurement in Multimedia Broadcast/Multicast Service (MBMS), comprising:
 a measurement time unit, configured to set a measurement time or obtain the measurement time set by a Universal Terrestrial Radio Access Network (UTRAN), the measurement time being set according a transmission time of MBMS point-to-multipoint Control Channel (MCCH) information transmitted by the UTRAN, wherein the measurement time does not overlap constantly with a transmission time of MCCH information transmitted by the UTRAN; and
 a performing unit, configured to perform inter-frequency/inter-RAT measurement according to the measurement time obtained.

20. A communication network system comprising a user equipment communicatively connected with a radio access network, wherein the user equipment is configured to set a measurement time not overlapping constantly with a transmission time of MBMS point-to-multipoint Control Channel (MCCH) information, the measurement time being set based on the transmission time of the MCCH information by the radio access network; and configured to perform inter-frequency/inter-RAT (Radio Access Technology) measurement according to the measurement time.

21. The communication network system of claim 20, wherein the transmission time of the MCCH information is obtained by the user equipment from system information transmitted by the radio access network.

22. The communication network system of claim 20, the user equipment is in an IDLE mode, a CELL_PCH state or a URA_PCH state.

* * * * *